(12) United States Patent
Furusawa et al.

(10) Patent No.: US 7,218,829 B2
(45) Date of Patent: May 15, 2007

(54) OPTICAL TRANSMISSION MODULE

(75) Inventors: Satoshi Furusawa, Osaka (JP);
Masaru Fuse, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 93 days.

(21) Appl. No.: 10/972,365

(22) Filed: Oct. 26, 2004

(65) Prior Publication Data

US 2005/0089296 A1    Apr. 28, 2005

(30) Foreign Application Priority Data

Oct. 27, 2003    (JP)    ............................. 2003-366450

(51) Int. Cl.
*G02B 6/26*    (2006.01)
(52) U.S. Cl. .......................................... 385/140; 385/5
(58) Field of Classification Search .................... 385/1, 385/2, 4, 5, 8, 14, 140, 147
See application file for complete search history.

(56) References Cited

U.S. PATENT DOCUMENTS

2005/0084202 A1*    4/2005    Smith et al. .................. 385/14

FOREIGN PATENT DOCUMENTS

JP            2000-47069        2/2000

* cited by examiner

*Primary Examiner*—Kevin S. Wood
(74) *Attorney, Agent, or Firm*—Wenderoth, Lind & Ponack, L.L.P.

(57) ABSTRACT

An optical transmission module and method are capable of suppressing the occurrence of multiplexed reflection light, thereby making it possible to easily carry out an optical coupling operation at low cost. A loss generator having an attenuation factor determined based on an extinction ratio of a modulation signal is provided to attenuate reflection light in a transmission path, thereby making it possible to provide a low-cost optical transmission module, which ensures a practically satisfactory efficiency, without providing an optical isolator component. Also, in the optical transmission module, the intensity of light is adjusted by the loss generator. Thus, it is possible to realize the optical transmission module using an optical mounting technique with such accuracy as employed for an ordinary module.

10 Claims, 7 Drawing Sheets

OPTICAL TRANSMISSION MODULE

BACKGROUND OF THE INVENTION

1. Field of the Invention

The present invention relates to an optical transmission module and method which directly intensity-modulate a semiconductor laser to carry out optical transmission, and more particularly to an optical transmission module connected to a transmission path, which includes a reflection point having a predetermined reflection coefficient, and an optical transmission method for setting a reflectivity condition of the optical module for carrying out optical transmission.

2. Description of the Background Art

Conventionally, through the rapid spread of the Internet, the transmission capacity of data communication networks has been increased. While the transmission capacity has been increased, middle- and long-distance systems, typified by metro networks, have become bottlenecks of the communication networks, increasing the need for techniques and optical devices which economically realize faster middle- and long-distance systems. As for short-distance data transmission, through standardization activities of 10-Gigabit-Ethernet, etc., reduction in size and cost of optical devices is actively sought.

As a light emitting device, which is a key device for determining an optical transmission efficiency, a distributed feedback semiconductor laser is widely used. Semiconductor lasers, which are light emitting devices for use in middle- and long-distance transmission through single mode fibers, achieve a satisfactory transmission quality and broadband characteristics because of their narrow spectrum characteristics. In the case of using an ordinary semiconductor laser together with a transmission path which includes a reflection point, it is necessary to provide the semiconductor laser with an optical isolator component for the purpose of achieving a satisfactory system efficiency, while reducing interference noise. For example, the optical isolator component is composed of a combination of a Faraday element having a magneto-optic effect and a polarizer. Even if the semiconductor laser is not provided with the optical isolator component, it is possible to reduce interference noise in a multiplexed electrical signal. However, in the case of ordinary middle- or long-distance high-speed baseband optical transmission, where a narrow spectrum width is required, an interference noise level is increased, and therefore the usefulness of such a semiconductor laser is low.

Figure 6:
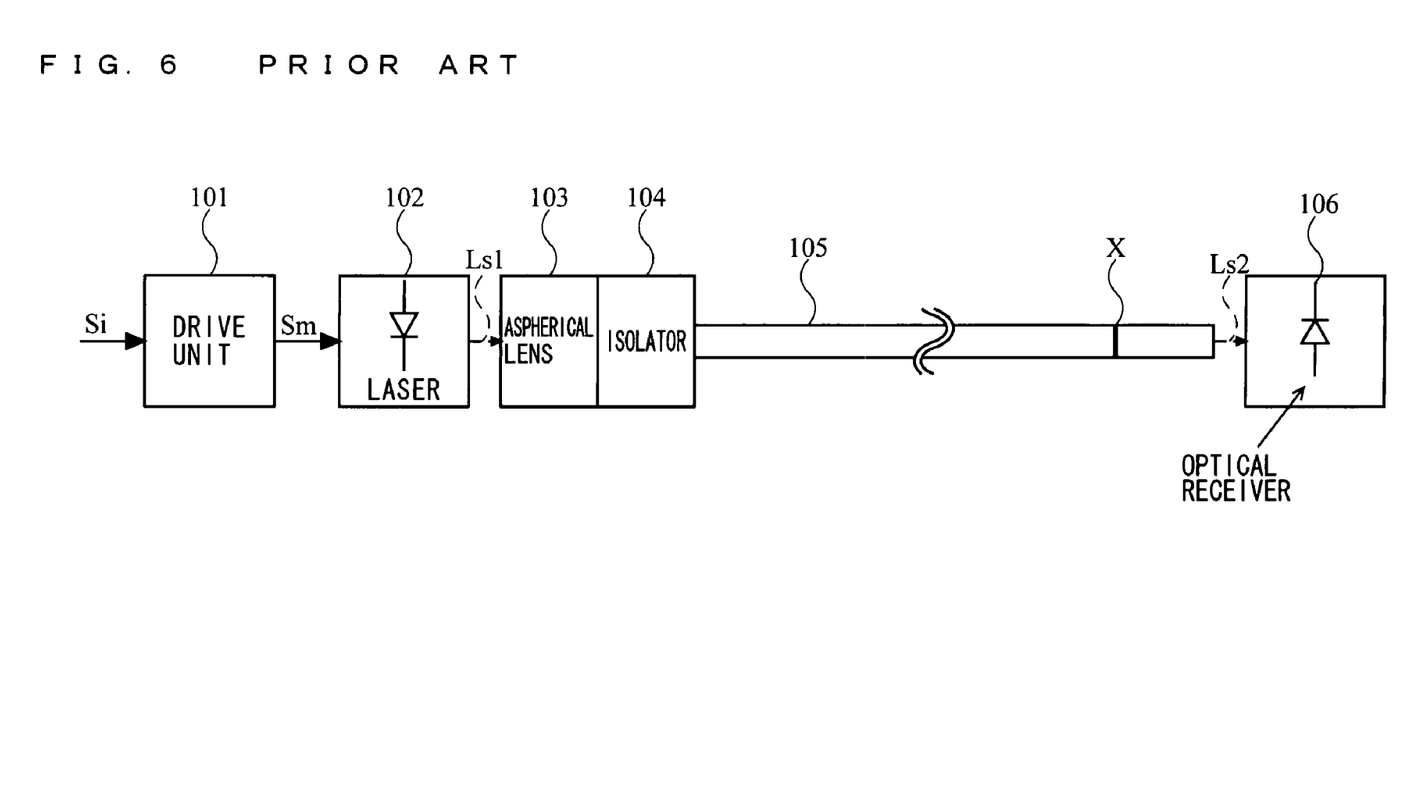
FIG. 6 is a block diagram showing a schematic structure of the optical transmission/reception system.
Figure 7:
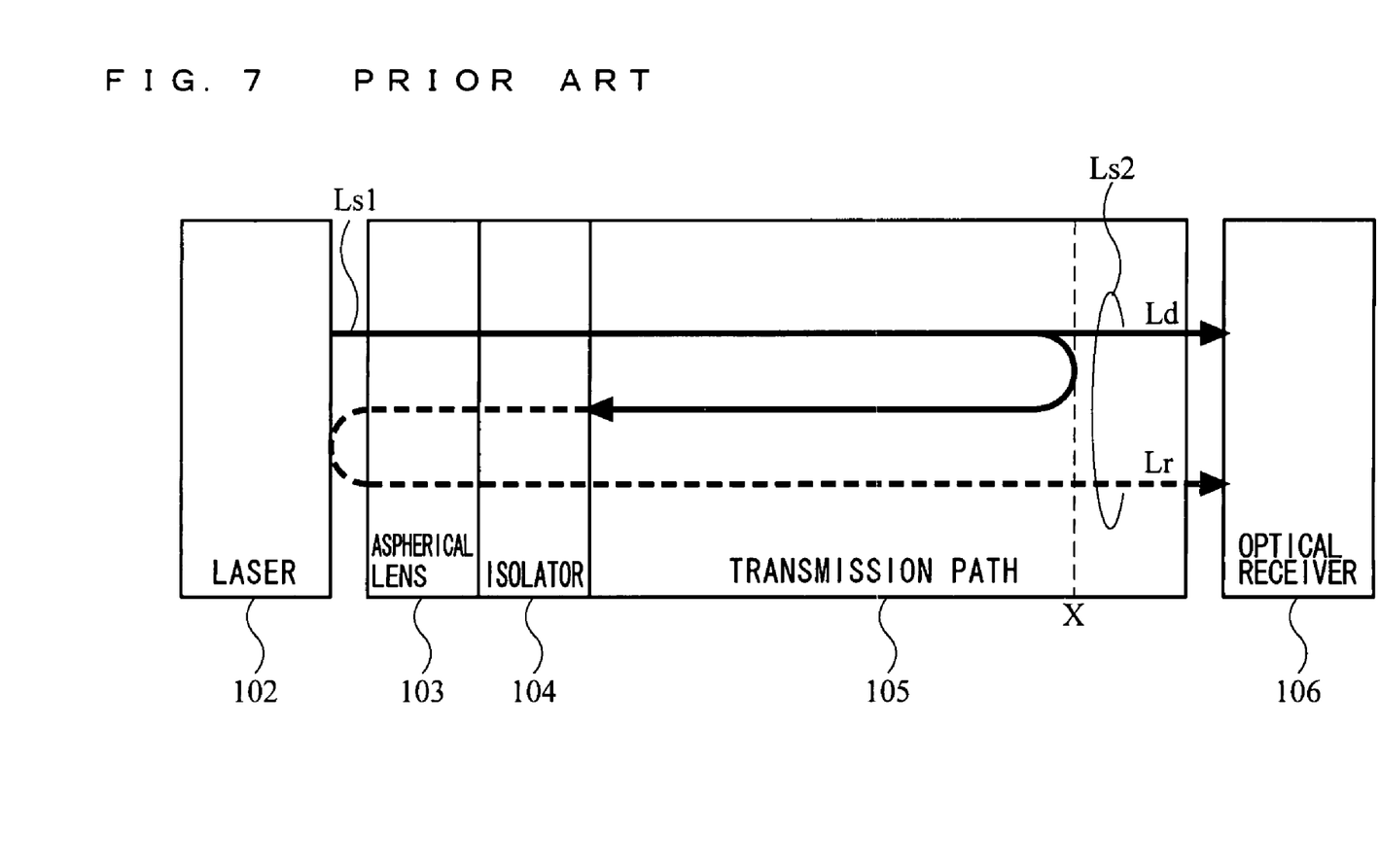
FIG. 7 is a diagram used for explaining how an optical signal propagates through the optical transmission/reception system shown in FIG. 6.

Hereinbelow, a conventional optical transmission/reception system including an optical isolator component is described. FIG. 6 is a block diagram showing a schematic structure of the optical transmission/reception system, and FIG. 7 is a diagram used for explaining how an optical signal propagates through the optical transmission/reception system shown in FIG. 6.

In FIG. 6, the conventional optical transmission/reception system includes a drive unit 101, a semiconductor laser 102, an aspherical lens 103, an optical isolator 104, a transmission path 105, and an optical receiver 106. If an input signal Si is inputted to the drive unit 101, the drive unit 101 converts the inputted signal into a modulation signal Sm having a predetermined extinction ratio to directly intensity-modulate the semiconductor laser 102. The semiconductor laser 102 performs electrical/optical conversion on the modulation signal Sm to generate signal light Ls1. The signal light Ls1 is outputted from the semiconductor laser 102 and collected by, for example, the aspherical lens 103 to be coupled through the optical isolator 104 to an input end of the transmission path 105. After propagating through the transmission path 105, the signal light Ls1 is outputted as signal light Ls2 from an output end of the transmission path 105, and received by the optical receiver 106.

Here, a reflection point X having a predetermined reflection coefficient is formed on the transmission path 105 due to influences of connection portions with optical connectors, etc. As shown in FIG. 7, the signal light Ls1 having been inputted to the transmission path 105 propagates on the transmission path 105, and is partially reflected at the reflection point X. A portion of the signal light Ls1 that has not been reflected at the reflection point X is inputted as direct light Ld into the optical receiver 106. On the other hand, reflection light Lr, which has been reflected at the reflection point X on the transmission path 105 to propagate in a direction opposite to that of the signal light Ls1, is re-reflected by an output end surface, a laser active region, etc., of the semiconductor laser 102. Thereafter, the re-reflected reflection light (multiplexed reflection light) Lr is outputted as the signal light Ls2 together with the direct light Ld from the output end of the transmission path 105 to the optical receiver 106.

However, the reflection light Lr, which has been reflected at the reflection point X on the transmission path 105 to propagate in the direction opposite to that of the signal light Ls1, is weakened by the optical isolator 104, making it possible to prevent the reflection light Lr from being re-reflected by the output end surface, the laser active region, etc., of the semiconductor laser 102. That is, it is possible to prevent the multiplexed reflection light Lr from occurring and being outputted to the optical receiver 106. Accordingly, it is possible to prevent interference noise from occurring in the optical receiver 106 due to detection of the direct light Ld and the multiplexed reflection light Lr from the signal light Ls2.

Japanese Laid-Open Patent Publication No. 2000-47069 discloses a semiconductor laser module in which an output end surface of a semiconductor laser makes an angle with optical fibers. In the semiconductor module, the angle between the output end surface of the semiconductor laser and the optical fibers prevents the reflection light from being re-reflected by the output end surface, a laser active region, etc., of the semiconductor laser.

Regarding the optical transmission/reception system including the optical isolator 104, the cost of the optical isolator 104 is high, and therefore it is difficult to reduce the cost of the optical transmission module including the optical isolator 104.

As for the semiconductor laser module disclosed in Japanese Laid-Open Patent Publication No. 2000-47069, high accuracy is required for adjusting optical coupling conditions with the angled optical fibers. That is, there is a difficulty in optically coupling the semiconductor laser with the optical fibers, resulting in an increase in cost of the optical transmission module.

SUMMARY OF THE INVENTION

Therefore, an object of the present invention is to provide an optical transmission module and method capable of suppressing occurrence of multiplexed reflection light, thereby making it possible to easily carry out an optical coupling operation at low cost.

The present invention has the following features to attain the object mentioned above. It should be noted that reference numerals, etc., in parentheses merely indicate correspondence with a preferred embodiment which will be described further below for the purpose of better understanding of the present invention, and do not restrict the scope of the present invention.

An optical transmission module (10) of the present invention transmits signal light (Ls1, Ls3) to a transmission path (5). The optical transmission module includes a drive unit (1, 11), a signal light output unit (2, 12), and a loss generator (4, 18). The drive unit outputs a modulation signal (Sm). The signal light output unit performs electrical/optical conversion on the modulation signal outputted from the drive unit to generate signal light with a predetermined extinction ratio (B), and outputs the generated signal light. The loss generator attenuates light propagating between the signal light output unit and the transmission path by a predetermined attenuation factor (C), thereby attenuating the signal light outputted from the signal light output unit by the predetermined attenuation factor, and outputs the attenuated signal light to the transmission path.

The predetermined attenuation factor of the loss generator may be set based on at least an extinction ratio of the signal light output unit. In the case where the transmission path has formed thereon a reflection portion (a reflection point X) having a predetermined reflection coefficient (γ1), if the predetermined reflection coefficient of the reflection portion is A, the extinction ratio of the signal light output unit is B, a signal Q factor of the signal light is Q, a tolerable penalty for a bit error rate is D (Ds), and the predetermined attenuation factor of the loss generator is C, the attenuation factor C is set by the following expression (5):

$$C \approx \frac{B}{(B-1)\cdot Q} \cdot \sqrt{\frac{1-10^{-D/5}}{2\cdot A}}.$$

The optical transmission module may further include an output light detection unit (13), a reflection light detection unit (14), and a comparison unit (15). The output light detection unit detects an intensity of output light from the signal light output unit. The reflection light detection unit receives a portion of reflection light (Lr) outputted from the transmission path to the signal light output unit, and detects an intensity of the reflection light. The comparison unit outputs a first control signal (Cs1) for controlling a bias level and modulation amplitude of the modulation signal outputted by the drive unit (11) and a second control signal (Cs2) for controlling the attenuation factor of the loss generator (the variable loss generator 18), based on the intensity of the output light detected by the output light detection unit and the intensity of the reflected light detected by the reflection light detection unit. In this case, the drive unit generates and outputs the modulation signal having a bias level and modulation amplitude in accordance with the first control signal outputted from the comparison unit. The signal light output unit performs electrical/optical conversion on the modulation signal outputted from the drive unit to generate signal light with an extinction ratio corresponding to the bias level and the modulation amplitude of the modulation signal, and outputs the generated signal light. The loss generator adjusts the attenuation factor in accordance with the second control signal outputted from the comparison unit, and attenuates the light propagating between the signal light output unit and the transmission path by the adjusted attenuation factor.

The comparison unit may output the second control signal, such that an intensity ratio (ε) of the intensity of the reflection light detected by the reflection light detection unit to the intensity of the output light detected by the output light detection unit becomes a predetermined value, and may output the first control signal for adjusting the bias level and the modulation amplitude of the modulation signal such that the extinction ratio of the signal light output unit becomes constant. Specifically, the comparison unit outputs the second control signal such that the intensity ratio becomes a value based on the extinction ratio of the signal light output unit. For example, in the case where the intensity ratio is ε, the extinction ratio of the signal light output unit is B, a signal Q factor of the signal light is Q, and a tolerable penalty for a bit error rate is D, the comparison unit outputs the second control signal such that the intensity ratio ε is obtained as follows:

$$\varepsilon = \left\{\frac{B}{(B-1)Q}\right\}^2 \left(\frac{1-10^{D/5}}{2}\right).$$

An optical transmission method of the present invention transmits signal light from an optical transmission module to a transmission path. The optical transmission method includes the steps of: outputting a modulation signal; performing electrical/optical conversion on the modulation signal to generate signal light with a predetermined extinction ratio and outputting the generated signal light; and attenuating light propagating between the optical transmission module and the transmission path by a predetermined attenuation factor, thereby attenuating the signal light by the predetermined attenuation factor, and outputting the attenuated signal light to the transmission path.

The predetermined attenuation factor may be set based on at least the predetermined extinction ratio. For example, in the case where the transmission path has formed there on a reflection portion having a predetermined reflection coefficient, if the reflection coefficient of the reflection portion is A, the extinction ratio is B, a signal Q factor of the signal light is Q, a tolerable penalty for a bit error rate is D, and the predetermined attenuation factor is C, the attenuation factor C is set as follows:

$$C \approx \frac{B}{(B-1)\cdot Q} \cdot \sqrt{\frac{1-10^{-D/5}}{2\cdot A}}.$$

Alternatively, the modulation signal may be generated so as to have a bias level and modulation amplitude determined based on an intensity of the signal light and an intensity of at least a portion of reflection light reflected by the transmission path, the electrical/optical conversion may be performed on the modulation signal to generate signal light with an extinction ratio determined by the bias level and the modulation amplitude, and the predetermined attenuation factor may be adjusted based on the intensity of the signal light and the intensity of the reflection light.

The predetermined attenuation factor may be adjusted such that an intensity ratio of the intensity of the reflection light to the intensity of the signal light becomes a predetermined value, and the bias level and the modulation amplitude of the modulation signal may be adjusted such that the extinction ratio becomes constant. Specifically, the predetermined attenuation factor is adjusted such that the intensity ratio becomes a value based on the extinction ratio. For example, in the case where the intensity ratio is ε, the extinction ratio is B, a signal Q factor of the signal light is Q, and a tolerable penalty for a bit error rate is D, the predetermined attenuation factor is adjusted such that the intensity ratio ε is obtained as follows:

$$\varepsilon = \left\{\frac{B}{(B-1)Q}\right\}^2 \left(\frac{1-10^{D/5}}{2}\right).$$

In the optical transmission module of the present invention, the loss generator, which has an attenuation factor determined based on an extinction ratio of a modulation signal, is provided to attenuate reflection light in a transmission path, thereby making it possible to provide a low-cost optical transmission module, which ensures a practically satisfactory efficiency, without providing an optical isolator component. Also, in the optical transmission module, the intensity of light is adjusted by the loss generator. Thus, it is possible to realize the optical transmission module using an optical mounting technique with such accuracy as employed for an ordinary module.

In the case where the attenuation factor of the loss generator is set based on an extinction ratio, etc., the attenuation factor can be determined based on a known value(s), making it possible to readily set the attenuation factor of the loss generator.

Also, in the case where the attenuation factor of the loss generator and a bias level and modulation amplitude of a modulation signal are set based on the intensity of output light and the quality of reflection light, the attenuation factor can be automatically adjusted so as to attenuate the reflection light in the transmission path. Also, it is possible to stabilize an output of the optical transmission module.

Also, in the case where the intensity ratio of the intensity of the reflection light to the intensity of the output light is adjusted so as to become a value based on, for example, an extinction ratio, the attenuation factor can be set so as to be consistent with a target value based on a known value. Thus, it is possible to readily set the target value of the attenuation factor of the loss generator, making it possible to realize a low-cost optical transmission module, which ensures a practically satisfactory efficiency, without providing an optical isolator component.

Also, the optical transmission method of the present invention achieves an effect similar to that achieved by the above-described optical transmission module.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
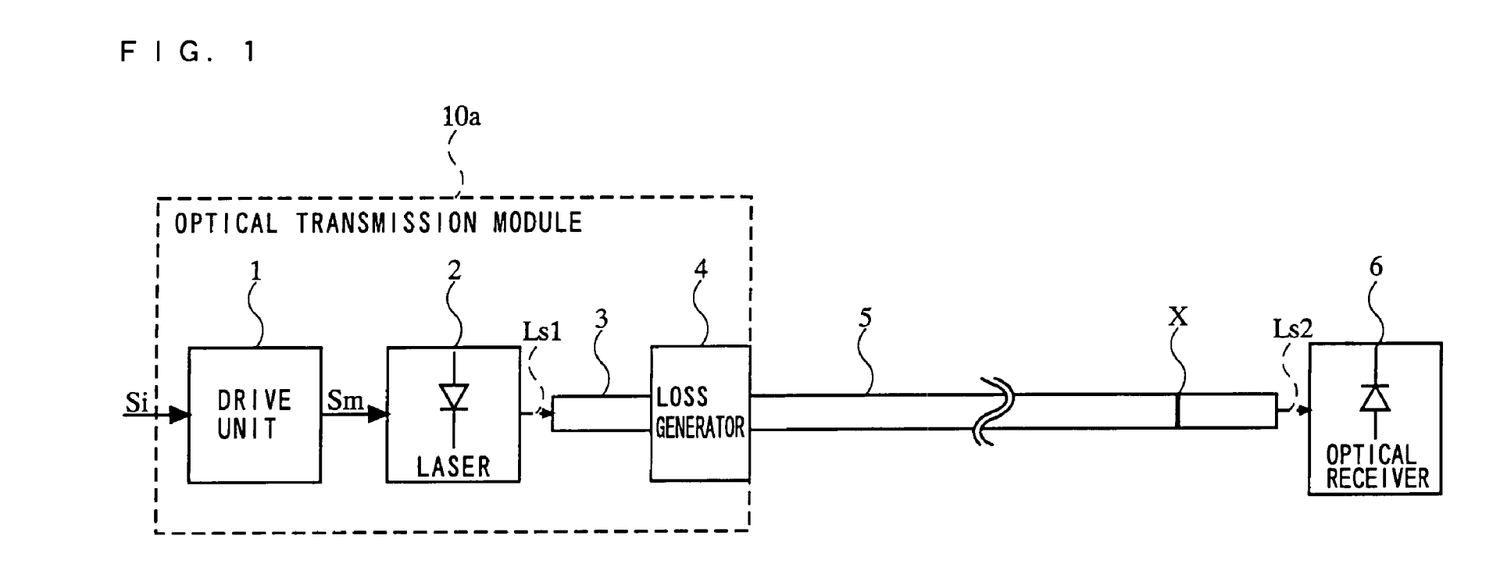
FIG. 1 is a block diagram showing a schematic structure of an optical transmission/reception system including an optical transmission module according to a first embodiment of the present invention.
Figure 2:
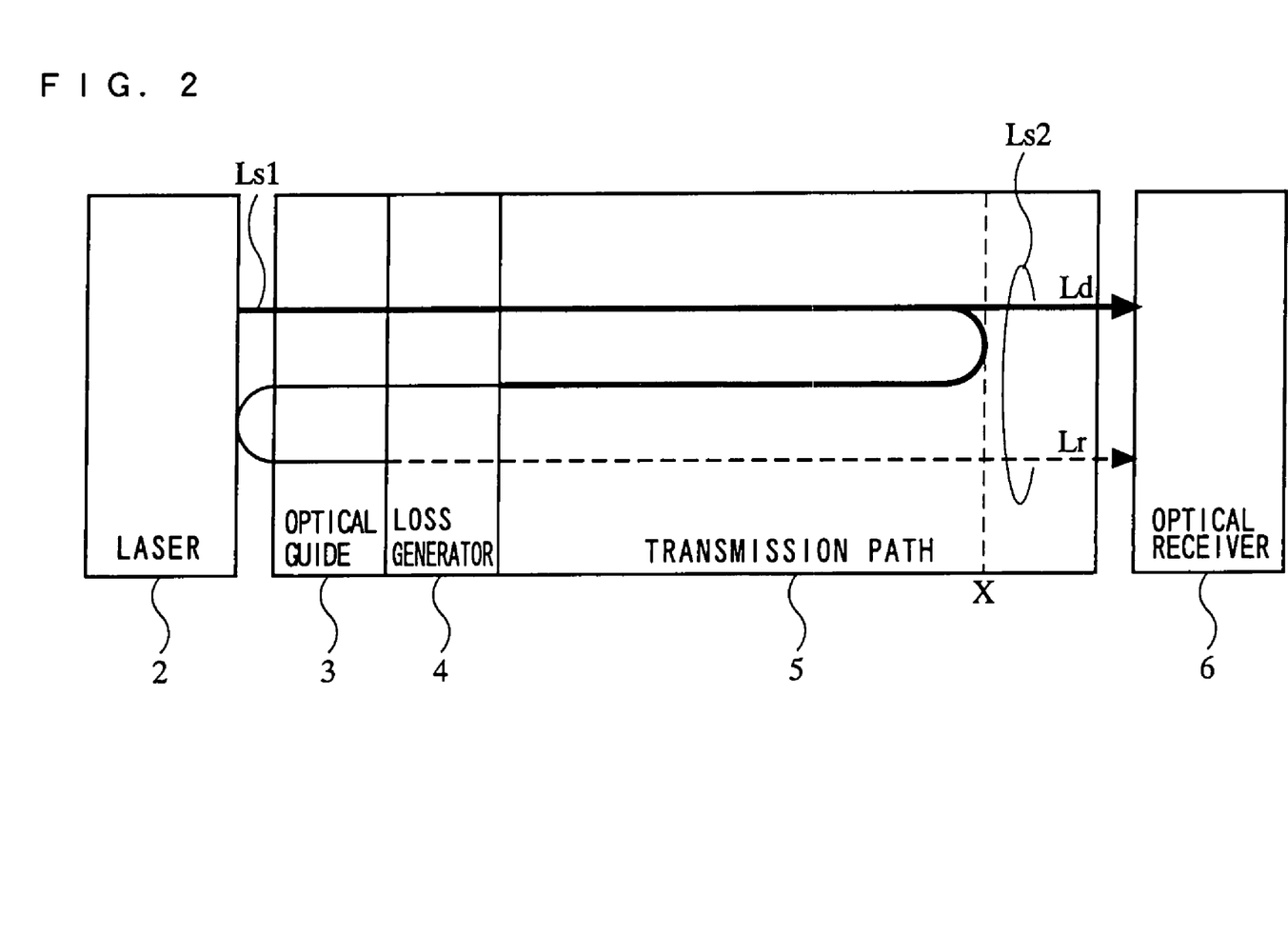
FIG. 2 is a diagram used for explaining how an optical signal propagates through the optical transmission/reception system shown in FIG. 1.

Referring to FIGS. 1 and 2, an optical transmission/reception system including an optical transmission module according to a first embodiment of the present invention is described. FIG. 1 is a block diagram showing a schematic structure of the optical transmission/reception system including the optical transmission module according to the first embodiment, and FIG. 2 is a diagram used for explaining how an optical signal propagates through the optical transmission/reception system shown in FIG. 1.

In FIG. 1, the optical transmission/reception system includes a drive unit 1, a semiconductor laser 2, an optical guide 3, a loss generator 4, a transmission path 5, and an optical receiver 6. The drive unit 1, the semiconductor laser 2, the optical guide 3, and the loss generator 4 compose an optical transmission module 10a according to the first embodiment.

The drive unit 1 receives an input signal Si, and converts it into a modulation signal Sm having a predetermined extinction ratio B to directly intensity-modulate the semiconductor laser 2. The semiconductor laser 2 performs electrical/optical conversion on the modulation signal Sm to generate signal light Ls1. The signal light Ls1 is outputted from the semiconductor laser 2 to be optically coupled to the optical guide 3. The loss generator 4 is provided between the optical guide 3 and the transmission path 5 to attenuate light propagating therethrough at a predetermined attenuation factor C. For example, the loss generator 4 is composed of an existing optical attenuator or a material having a low transmittance. The signal light Ls1 having been optically coupled to the optical guide 3 experiences attenuation by the attenuation factor C within the loss generator 4 before being transmitted from the optical transmission module 10a to an input end of the transmission path 5. Then, after propagating through the transmission path 5, the signal light Ls1 is outputted as signal light Ls2 from an output end of the transmission path 5, and received by the optical receiver 6. The optical receiver 6 detects the signal light Ls2 outputted from the transmission path 5.

Here, it is assumed that a reflection point X having a predetermined reflection coefficient γ1 is formed on the transmission path 5 due to influences of connection portions with optical connectors, etc. As shown in FIG. 2, the signal light Ls1 having been inputted to the transmission path 5 propagates on the transmission path 5, and is partially reflected at the reflection point X. While a portion of the signal light Ls1 that has not been reflected at the reflection point X is inputted as direct light Ld into the optical receiver 6, the signal light Ls1 propagating on the transmission path 5 is partially reflected at the reflection point X with the reflection coefficient γ1 to propagate, as reflection light Lr, on the transmission path 5 in a direction opposite to that of the signal light Ls1 (i.e., a direction toward the semiconductor laser 2).

The reflection light Lr reflected at the reflection point X propagates on the transmission path 5 in the above-mentioned opposite direction, and is attenuated by the attenuation factor C within the loss generator 4. The attenuated light is outputted through the optical guide 3 to the semiconductor laser 2. The semiconductor laser 2 has a limited number of reflection points having a predetermined reflection coefficient γ2 on an output end surface of a semiconductor laser element and a distribution mirror within an active region thereof. Accordingly, multiple reflection occurs at the reflection points of the semiconductor laser 2, so that the reflection light Lr having been outputted toward the semiconductor laser 2 is re-reflected at the reflection points with the reflection coefficient γ2 toward the optical guide 3. Then, the reflection light Lr is further attenuated by the attenuation factor C within the loss generator 4 before propagating through the transmission path 5 (as indicated by broken lines in FIG. 2). Then, the reflection light (multiplexed reflection light) Lr multiplexed with the direct light Ld is outputted as signal light Ls2 together with the direct the light Ld from an output end of the transmission path 5 to the optical receiver 6. Accordingly, the optical receiver 6 detects the direct light Ld and the multiplexed reflection light Lr from the signal light Ls2.

In the case where frequency noise is RIN(f), a signal bandwidth of a baseband signal is Bw, and a line width of the semiconductor laser is Δv, the following expression (1) gives a total amount N of relative intensity noise caused to occur within the signal bandwidth when the optical receiver 6 carries out square-law detection of direct light Ld and multiplexed reflection light Lr, which is generated between two reflection points (with reflection points γ1 and γ2).

$$N = \int_0^{Bw} RIN(f)\,df = \frac{4}{\pi} \text{Arctan}\left(\frac{Bw}{\Delta v}\right) \gamma 1 \cdot \gamma 2 \quad (1)$$

In particular, where Δv<<Bw, the expression (1) is transformed into the following expression (2).

$$N \approx 2 \cdot \gamma 1 \cdot \gamma 2 \quad (2)$$

As is apparent from the above expression (2), the total amount N of the relative intensity noise is determined by a product of the reflection coefficients γ1 and γ2 of the two reflection points, i.e., an optical intensity ratio between the direct light Ld and the multiplexed reflection light Lr. Here, the loss generator 4 with the attenuation factor C is provided between the transmission path 5 and the optical guide 3, so that the multiplexed reflection light Lr is caused to pass through the loss generator three times, making it possible to reduce the multiplexed reflection light Lr by $C^2$ as compared to the direct light Ld. This allows an optical transmission element to increase an intensity ratio of the direct light Ld to the multiplexed reflection light Lr, making it possible to reduce the amount of interferential noise occurrence in the optical receiver 6. In this case, the total amount N of the relative intensity noise can be obtained by the following expression (3).

$$N \approx 2 \cdot \gamma 1 \cdot \gamma 2 \cdot C^2 \quad (3)$$

The transmission quality of the optical transmission/reception system can be given based on a penalty D for a transmitter bit error rate. If a signal Q factor is Q, the transmission quality is given by the following expression (4).

$$D \approx -5 \cdot \text{Log}\left\{1 - \left(\frac{B}{B-1}\right)^2\right\} \cdot Q^2 \cdot N \quad (4)$$

In the case where a tolerable penalty for ensuring a practically sufficient efficiency in the optical transmission/reception system is Ds, a reflection coefficient at the reflection point X is γ1, the extinction ratio of the modulation signal Sm is B, the signal Q factor is Q, and total reflection occurs at a reflection point in the semiconductor laser 2 (i.e., γ2=1), the attenuation factor C of the loss generator 4 can be obtained by the following expression (5).

$$C \approx \frac{B}{(B-1) \cdot Q} \cdot \sqrt{\frac{1 - 10^{-Ds/5}}{2 \cdot \gamma 1}} \quad (5)$$

By providing the loss generator 4 having the attenuation factor C obtained by the above expression (5), it is made possible to satisfy the tolerable penalty Ds, thereby ensuring the practically satisfactory efficiency in the optical transmission/reception system.

As such, in the optical transmission module according to the first embodiment, a loss generator, which has an attenuation factor determined based on an extinction ratio of a modulation signal, is provided for attenuating reflection light in a transmission path, thereby making it possible to provide a low-cost optical transmission module, which ensures a practically satisfactory efficiency, without providing an optical isolator component. Also, in the optical transmission module, the intensity of light is adjusted by the loss generator. Thus, it is possible to realize the optical transmission module using an optical mounting technique with such accuracy as employed for an ordinary module.

Second Embodiment

Figure 3:
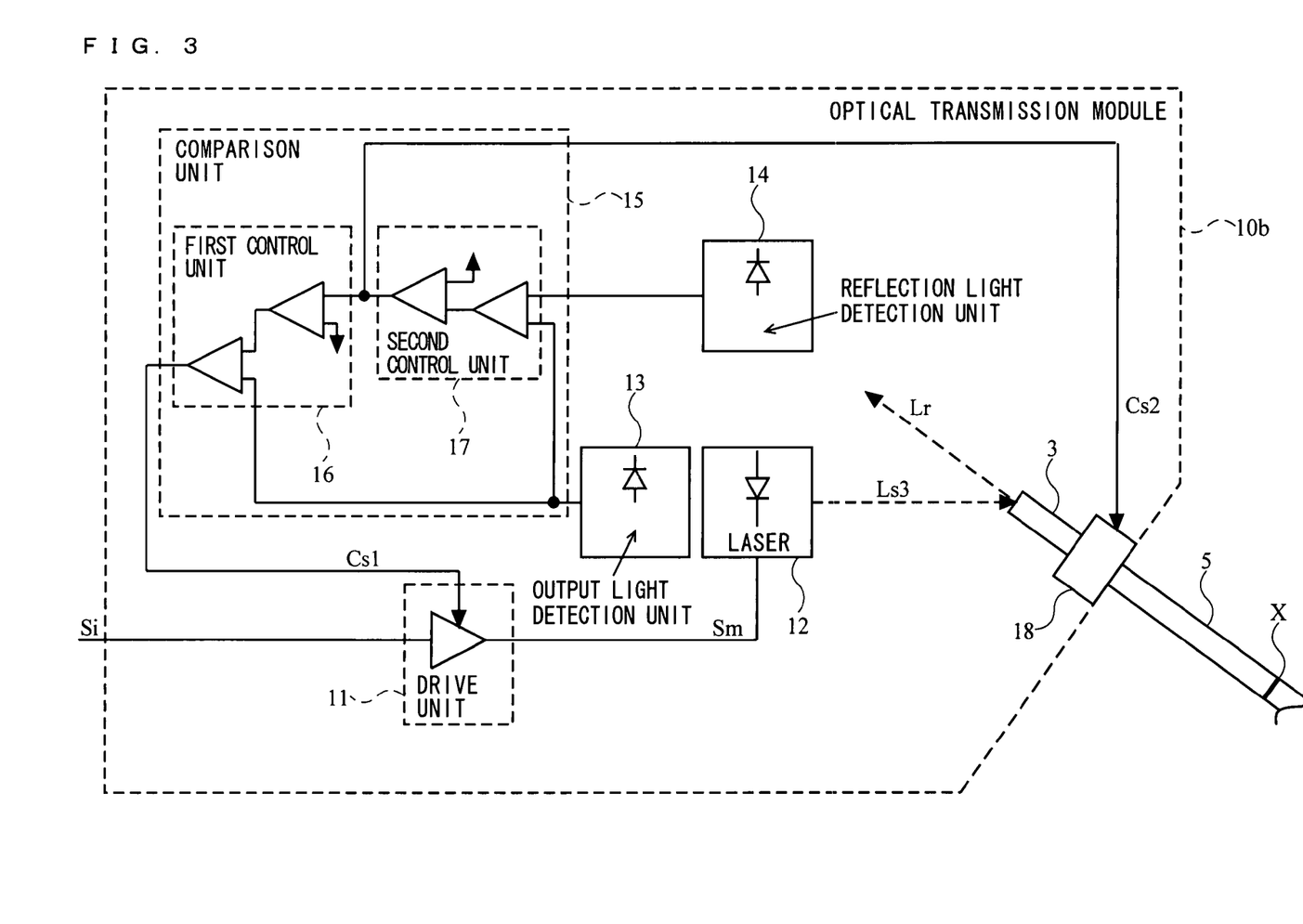
FIG. 3 is a block diagram showing a schematic structure of an optical transmission/reception system including an optical transmission module according to a second embodiment of the present invention.

Referring to FIG. 3, an optical transmission/reception system including an optical module according to a second embodiment of the present invention is described. In the optical transmission module described in the first embodiment, a loss generator having a predetermined attenuation factor is provided for maintaining the transmission quality related to multiple reflection noise. However, signal light outputted from the optical transmission module is attenuated by the loss generator. The optical transmission/reception system described in the second embodiment stabilizes an output from the optical transmission module. FIG. 3 is a block diagram showing a schematic structure of the optical transmission/reception system.

In FIG. 3, the optical transmission/reception system includes a drive unit 11, a semiconductor laser 12, an output light detection unit 13, a reflection light detection unit 14, a comparison unit 15, a variable loss generator 18, the optical guide 3, and the transmission path 5. The comparison unit 15 includes first and second control units 16 and 17. The drive unit 11, the semiconductor laser 12, the output light detection unit 13, the reflection light detection unit 14, the comparison unit 15, the variable loss generator 18, the optical guide 3 compose an optical transmission module 10*b* according to the second embodiment. Note that an optical signal transmitted through the transmission path 5 is received by an optical receiver which is not shown. The optical guide 3 and the transmission path 5, which are the same as those described in the first embodiment, are denoted by the same reference numerals, and the detailed descriptions thereof are omitted here.

The drive unit 11 receives an input signal Si, and converts it into a modulation signal Sm, which has a predetermined extinction ratio B and is biased based on a first control signal Cs1 outputted from the first control unit 16, for the purpose of directly intensity-modulating the semiconductor laser 12. The semiconductor laser 12 performs electrical/optical conversion on the modulation signal Sm to generate signal light Ls3. Then, the signal light Ls3 is outputted from a front end surface of the semiconductor laser 12, and optically coupled to a signal light input end of the optical guide 3. The intensity of light outputted from a rear end surface of the semiconductor laser 12 is detected by the output light detection unit 13. The output light detection unit 13 outputs a result of the detected intensity of the outputted light to each of the first and second control units 16 and 17.

Figure 4:
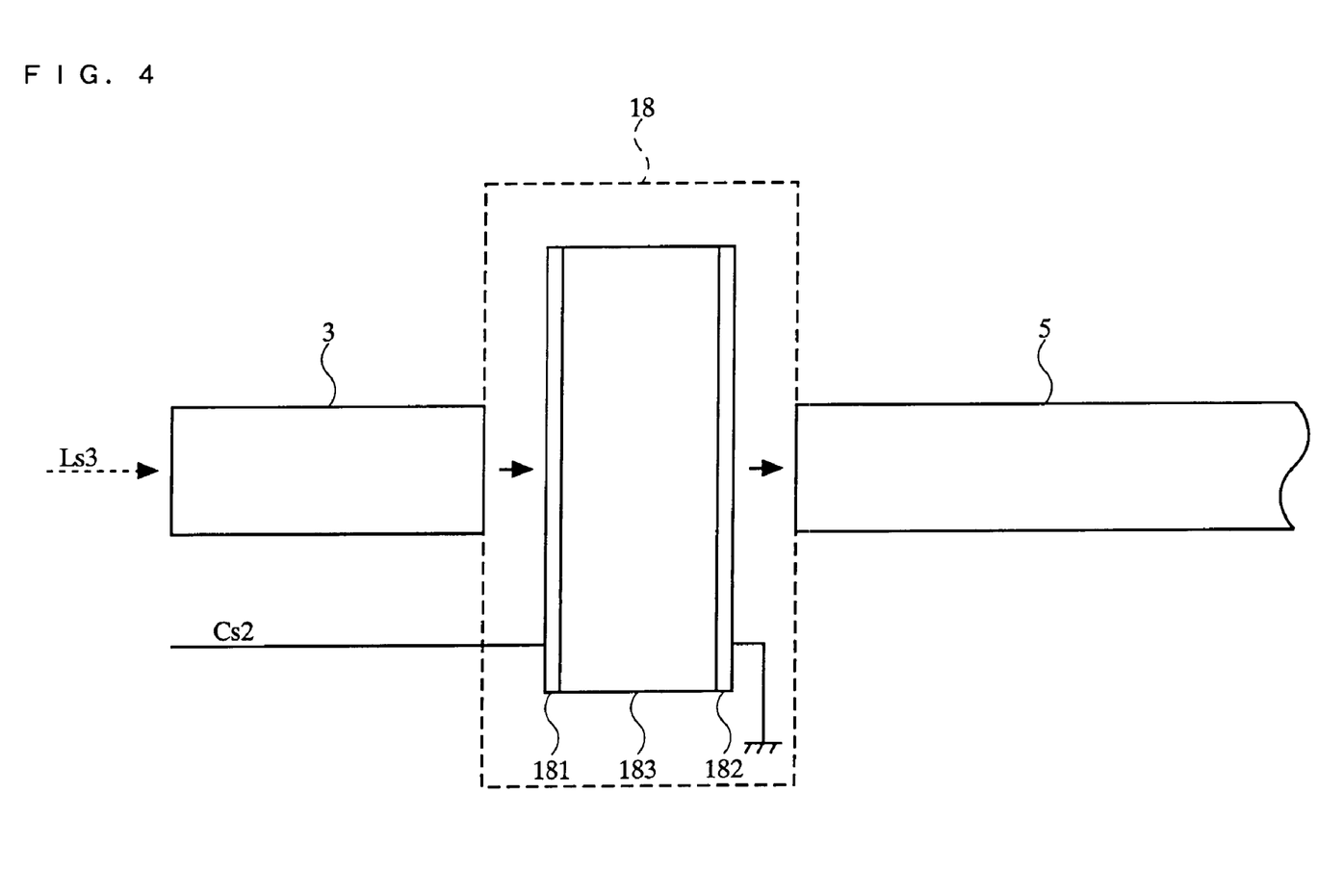
FIG. 4 is a schematic view showing an exemplary structure of a variable loss generator 18 shown in FIG. 3.
Figure 5:
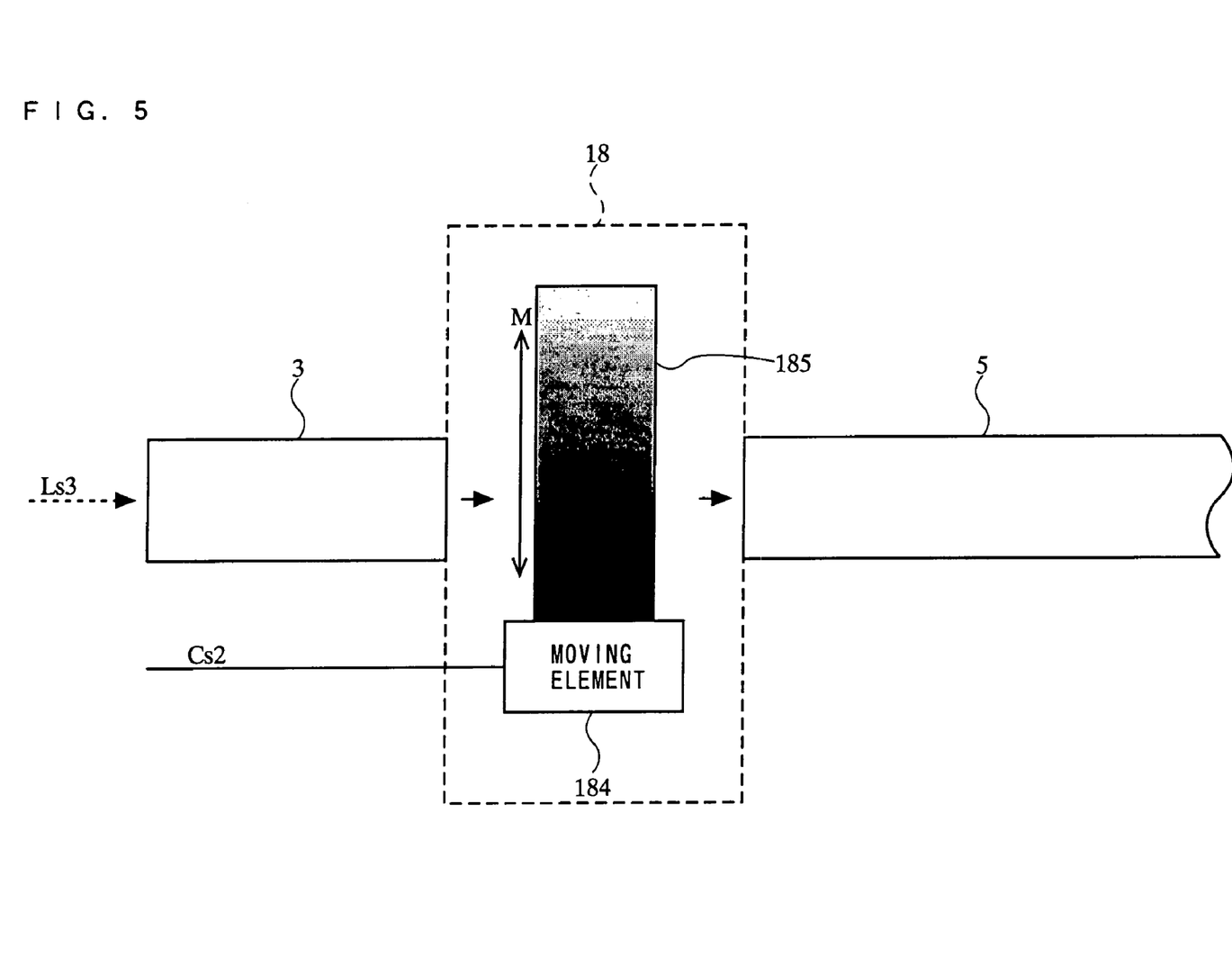
FIG. 5 is a schematic view showing another exemplary structure of the variable loss generator 18 shown in FIG. 3.

The variable loss generator 18 is provided between the optical guide 3 and the transmission path 5 for attenuating light propagating therethrough by an attenuation factor C based on a second control signal Cs2 outputted from the second control unit 17. Hereinbelow, exemplary structures of the variable loss generator 18 are described with reference to FIGS. 4 and 5. FIG. 4 is a schematic view showing an exemplary structure of the variable loss generator 18. FIG. 5 is a schematic view showing another exemplary structure of the variable loss generator 18.

In the exemplary structure of the variable loss generator 18 shown in FIG. 4, a liquid crystal element is provided such that an optical axis between the optical guide 3 and the transmission path 5 passes therethrough. The liquid crystal element of the variable loss generator 18 is composed of a pair of transparent electrode layers 181 and 182 and a liquid crystal layer 183. The transparent electrode layers 181 and 182 are provided on opposite surfaces of the liquid crystal layer 183. The transparent electrode layer 181 is adapted to be supplied with a second control signal Cs2. The transparent electrode layer 182 is grounded. Light transmittance of the liquid crystal layer 183 is changed based on the second control signal Cs2 outputted from the second control unit 17, thereby controlling the amount of loss of light transmitted through the variable loss generator 18 (i.e., the attenuation factor C of the variable loss generator 18).

In the exemplary structure of the variable loss generator 18 shown in FIG. 5, an optical filter 185 is provided such that the optical axis between the optical guide 3 and the transmission path 5 passes therethrough. The optical filter 185 is mounted on a moving element 184 such as an actuator. The optical filter 185 is movable in a predetermined direction (e.g., a direction perpendicular to the optical axis; a direction indicated by M in FIG. 5) in accordance with the second control signal Cs2 applied to the moving element 184. The optical filter 185 is formed such that an optical attenuation factor is increased/decreased stepwise in the moving direction. Alternatively, the optical filter 185 may be composed of a plurality of optical filters provided in the moving direction, which are gradually different in optical attenuation factor. The moving element 184 moves the optical filter 185 in accordance with the second control signal Cs2 outputted from the second control unit 17, thereby controlling the amount of loss of light transmitted through the variable loss generator 18 (i.e., the attenuation factor C of the variable loss generator 18).

The signal light Ls3 having been optically coupled to the optical guide 3 is attenuated by the variable loss generator 18 with the attenuation factor C, and then transmitted from the optical transmission module 10b to the input end of the transmission path 5. The signal light Ls3 propagating through the transmission path 5 is outputted from the output end of the transmission path 5, and received by an optical receiver (not shown).

Here, it is assumed that a reflection point X with a predetermined reflection coefficient γ1 is formed on the transmission path 5 due to influences of connection portions with optical connectors, etc. Accordingly, the signal light Ls3 having been inputted to the transmission path 5 is partially reflected at the reflection point X while propagating on the transmission path 5. A portion of the signal light Ls3 that has not been reflected at the reflection point X is inputted as direct light into the optical receiver. The signal light Ls3 propagating on the transmission path 5 is partially reflected at the reflection point X with the reflection coefficient γ1 to propagate, as reflection light Lr, along the transmission path 5 in a direction opposite to that of the signal light Ls3 (i.e., a direction toward the variable loss generator 18).

The reflection light Lr having been reflected at the reflection point X propagates through the transmission path 5 in the opposite direction to be attenuated by the variable loss generator 18 with the attenuation factor C before being outputted from a signal light input end of the optical guide 3. The intensity of the reflection light Lr having been outputted from the signal light input end of the optical guide 3 is partially detected by the reflection light detection unit 14. The reflection light detection unit 14 outputs a result of the detected intensity of the reflection light to the second control unit 17. Although FIG. 3 shows that the semiconductor laser 12 is arranged in a direction oblique to the optical axis of the optical guide 3 and the reflection light detection unit 14 is arranged on the optical axis, the present invention is not limited to such arrangements. The semiconductor laser 12 and the reflection light detection unit 14 can be arranged in other positions so long as the signal light Ls3 outputted from the semiconductor laser 12 is inputted into the signal light input end of the optical guide 3 and the reflection light Lr outputted from the signal light input end is partially inputted into the reflection light detection unit 14.

In the comparison unit 15, the first control unit 16 and the second control unit 17 generate a first control signal Cs1 and a second control signal Cs2 based on results of light intensities detected by the output light detection unit 13 and the reflection light detection unit 14. The first control signal Cs1 generated by the first control unit 16 is outputted to the drive unit 11, while the second control signal Cs2 generated by the second control unit 17 is outputted to each of the variable loss generator 18 and the first control unit 16. Hereinbelow, operations of the first and second control units 16 and 17 will be described.

The second control unit 17 controls the attenuation factor C of the variable loss generator 18 such that a ratio of the intensity of output light detected by the output light detection unit 13 to the intensity of output light detected by the reflection light detection unit 14 becomes such a value as to ensure a practically satisfactory efficiency in the optical transmission/reception system. In the case where a tolerable penalty for ensuring the practically satisfactory efficiency in the optical transmission/reception system is Ds, the reflection coefficient of the reflection point X is γ1, the extinction ratio of the modulation signal Sm is B, the signal Q factor is Q, and the reflection light Lr outputted from the signal light input end of the optical guide 3 is totally reflected to return to the signal light input end of the optical guide 3, the second control unit 17 controls the attenuation factor C such that the ratio ε (the intensity of reflection light detected by the reflection light detection unit 14/the intensity of output light detected by the output light detection unit 13) satisfies the following expression (6).

$$\varepsilon = kC^2 \cdot \gamma 1 = \left\{ \frac{B}{(B-1)Q} \right\}^2 \left( \frac{1 - 10^{Ds/5}}{2} \right) \propto B \quad (6)$$

The second control unit 17 outputs the second control signal Cs2, such that the ratio ε constantly satisfies the above expression (6), thereby carrying out feedback control of the attenuation factor C of the variable loss generator 18. The ratio ε is set such that the tolerable penalty Ds is satisfied, and therefore the above control operation by the second control unit 17 constantly maintains the transmission quality related to multiple reflection noise. As is apparent from the above expression (6), the ratio ε is set based on the known extinction ratio B of the drive unit 11.

The first control unit 16 controls the drive unit 11, such that light is outputted with consideration of attenuation by the variable loss generator 18, based on the attenuation factor C controlled by the second control unit 17 and the intensity of output light detected by the output light detection unit 13. Specifically, the first control unit 16 controls a bias level and modulation amplitude of the modulation signal Sm based on the attenuation factor controlled by the second control unit 17, and outputs the first control signal Cs1 to control the drive unit 11 such that the extinction ratio B determined by the bias level and the modulation amplitude of the modulation signal Sm becomes constant. The above control operation by the first control unit 16 maintains the transmission quality related to multiple reflection noise, thereby stabilizing the intensity of signal light outputted from the optical transmission module 10b.

As such, in the optical transmission module according to the second embodiment, the loss generator having an attenuation factor obtained based on an extinction ratio of a modulation signal is provided to attenuate reflection light in a transmission path, thereby making it possible to realize a low-cost optical transmission module, which ensures a practically satisfactory efficiency, without providing an optical isolator component. Also, in the optical transmission module, the attenuation factor is automatically adjusted so as to attenuate reflection light in the transmission path, based on the intensity of reflection light detected in the transmission path and the extinction ratio of the modulation signal. Moreover, in the optical transmission module, the amount of light emission and the attenuation factor are detected to control the output light intensity such that light is outputted with consideration of attenuation, thereby stabilizing the output of the optical transmission module.

While the invention has been described in detail, the foregoing description is in all aspects illustrative and not restrictive. It is understood that numerous other modifications and variations can be devised without departing from the scope of the invention.

What is claimed is:

1. An optical transmission module for transmitting signal light to a transmission path, the optical transmission module comprising:

a drive unit for outputting a modulation signal;

a signal light output unit for performing electrical/optical conversion on the modulation signal outputted from the drive unit to generate signal light with a predetermined extinction ratio, and for outputting the generated signal light; and a loss generator for attenuating light propagating between the signal light output unit and the transmission path by a predetermined attenuation factor, thereby attenuating the signal light outputted from the signal light output unit by the predetermined attenuation factor, and for outputting the attenuated signal light to the transmission path, wherein the predetermined attenuation factor of the loss generator is set based on at least an extinction ratio of the signal light output unit, and the transmission path has formed thereon a reflection portion having a predetermined reflection coefficient, and if the predetermined reflection coefficient of the reflection portion is A, the extinction ratio of the signal light output unit is B, a signal Q factor of the signal light is Q, a tolerable penalty for a bit error rate is D, and the predetermined attenuation factor of the loss generator is C, the attenuation factor C is set as follows:

$$C \approx \frac{B}{(B-1) \cdot Q} \cdot \sqrt{\frac{1 - 10^{-D/5}}{2 \cdot A}}.$$

2. An optical transmission module for transmitting signal light to a transmission path, the optical transmission module comprising:

a drive unit for outputting a modulation signal;

a signal light output unit for performing electrical/optical conversion on the modulation signal outputted from the drive unit to generate signal light with a predetermined extinction ratio, and for outputting the generated signal light;

a loss generator for attenuating light propagating between the signal light output unit and the transmission path by a predetermined attenuation factor, thereby attenuating the signal light outputted from the signal light output unit by the predetermined attenuation factor, and for outputting the attenuated signal light to the transmission path;

an output light detection unit for detecting an intensity of output light from the signal light output unit;

a reflection light detection unit for receiving a portion of reflection light outputted from the transmission path to the signal light output unit, and for detecting an intensity of the reflection light; and a comparison unit for outputting a first control signal for controlling a bias level and a modulation amplitude of the modulation signal outputted by the drive unit and a second control signal for controlling the attenuation factor of the loss generator, based on the intensity of the output light detected by the output light detection unit and the intensity of the reflected light detected by the reflection light detection unit, wherein the drive unit is operable to generate and output the modulation signal having a bias level and a modulation amplitude in accordance with the first control signal outputted from the comparison unit, the signal light output unit is operable to perform the electrical/optical conversion on the modulation signal outputted from the drive unit to generate the signal light with an extinction ratio corresponding to the bias level and the modulation amplitude of the modulation signal, and output the generated signal light, and the loss generator is operable to adjust the attenuation factor in accordance with the second control signal outputted from the comparison unit, and attenuate the light propagating between the signal light output unit and the transmission path by the adjusted attenuation factor.

3. An optical transmission module according to claim 2, wherein the comparison unit is operable to output the second control signal, such that an intensity ratio of the intensity of the reflection light detected by the reflection light detection unit to the intensity of the output light detected by the output light detection unit becomes a predetermined value, and output the first control signal for adjusting the bias level and the modulation amplitude of the modulation signal such that the extinction ratio of the signal light output unit becomes constant.

4. An optical transmission module according to claim 3, wherein the comparison unit is operable to output the second control signal such that the intensity ratio becomes a value based on the extinction ratio of the signal light output unit.

5. An optical transmission module according to claim 4, wherein if the intensity ratio is $\epsilon$, the extinction ratio of the signal light output unit is B, a signal Q factor of the signal light is Q, and a tolerable penalty for a bit error rate is D, the comparison unit is operable to output the second control signal such that the intensity ratio $\epsilon$ is obtained as follows:

$$\varepsilon = \left\{\frac{B}{(B-1)Q}\right\}^2 \left(\frac{1-10^{D/5}}{2}\right).$$

6. An optical transmission method for transmitting signal light from an optical transmission module to a transmission path, the optical transmission method comprising:

outputting a modulation signal;

performing electrical/optical conversion on the modulation signal to generate signal light with a predetermined extinction ratio and outputting the generated signal light; and attenuating light propagating between the optical transmission module and the transmission path by a predetermined attenuation factor, thereby attenuating the signal light by the predetermined attenuation factor, and outputting the attenuated signal light to the transmission path, wherein the predetermined attenuation factor is set based on at least the predetermined extinction ratio, and the transmission path has formed thereon a reflection portion having a predetermined reflection coefficient, and if the reflection coefficient of the reflection portion is A, the extinction ratio is B, a signal Q factor of the signal light is Q, a tolerable penalty for a bit error rate is D, and the predetermined attenuation factor is C, the attenuation factor C is set as follows:

$$C \approx \frac{B}{(B-1)\cdot Q} \cdot \sqrt{\frac{1-10^{-D/5}}{2\cdot A}}.$$

7. An optical transmission method for transmitting signal light from an optical transmission module to a transmission path, the optical transmission method comprising:

outputting a modulation signal;

performing electrical/optical conversion on the modulation signal to generate signal light with a predetermined extinction ratio and outputting the generated signal light; and attenuating light propagating between the optical transmission module and the transmission path by a predetermined attenuation factor, thereby attenuating the signal light by the predetermined attenuation factor, and outputting the attenuated signal light to the transmission path, wherein the modulation signal has a bias level and a modulation amplitude determined based on an intensity of the signal light and an intensity of at least a portion of reflection light reflected by the transmission path, the performing of the electrical/optical conversion comprises performing the electrical/optical conversion on the modulation signal to generate the signal light with an extinction ratio determined by the bias level and the modulation amplitude, and the attenuating of the light propagating between the optical transmission module and the transmission path comprises adjusting the predetermined attenuation factor based on the intensity of the signal light and the intensity of the reflection light.

8. An optical transmission method according to claim 7, wherein the adjusting of the predetermined attenuation factor comprising adjusting the predetermined attenuation factor such that an intensity ratio of the intensity of the reflection light to the intensity of the signal light becomes a predetermined value, and the bias level and the modulation amplitude of the modulation signal are adjusted such that the extinction ratio becomes constant.

9. An optical transmission method according to claim 8, wherein the adjusting of the predetermined attenuation factor comprising adjusting the predetermined attenuation factor such that the intensity ratio becomes a value based on the extinction ratio.

10. An optical transmission method according to claim 9, wherein if the intensity ratio is $\epsilon$, the extinction ratio is B, a signal Q factor of the signal light is Q, and a tolerable penalty for a bit error rate is D, the adjusting of the predetermined attenuation factor comprises adjusting the predetermined attenuation factor such that the intensity ratio $\epsilon$ is obtained as follows:

$$\varepsilon = \left\{\frac{B}{(B-1)Q}\right\}^2 \left(\frac{1-10^{D/5}}{2}\right).$$

* * * * *